Figure 1:
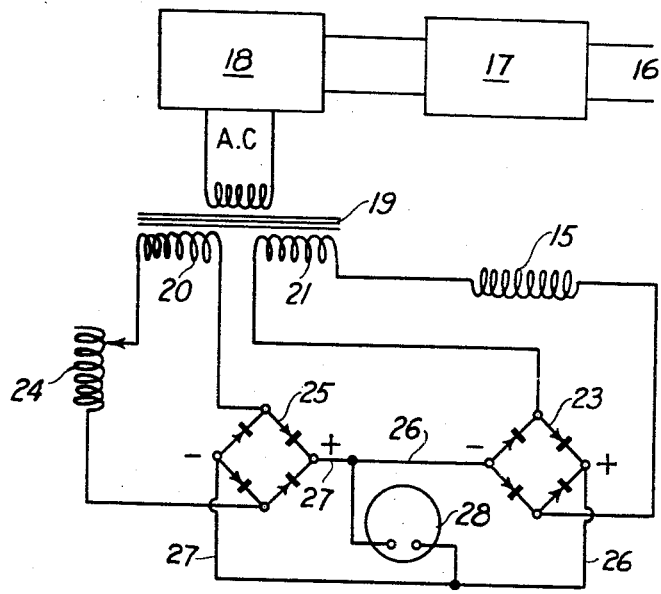

Jan. 13, 1942.  K. R. ELDREDGE  2,269,584
ELECTRICAL MEASURING DEVICE
Filed Dec. 8, 1939

Inventor
KENNETH R. ELDREDGE
by
Attorney

Patented Jan. 13, 1942

2,269,584

UNITED STATES PATENT OFFICE 2,269,584

ELECTRICAL MEASURING DEVICE

Kenneth R. Eldredge, Berkeley, Calif., assignor to Standard Oil Company of California, San Francisco, Calif., a corporation of Delaware Application December 8, 1939, Serial No. 308,119

5 Claims. (Cl. 177—351)

This invention relates to an electrical measuring device and particularly one which is intended to measure small changes in the current flowing in an alternating current circuit, such as may be caused by a change in the impedance of a winding in the circuit due to a variation in the magnetic properties of a core in said winding.

In the measurement of mechanical forces it is sometimes advantageous to utilize the phenomenon of magnetostriction, in which a member of nickel-iron alloy, for example, is stressed by the force in question, the resultant change in the magnetic permeability of the member being utilized to modify the impedance of a winding through which a constant frequency alternating current is passed, the change in current being measured by a suitable instrument which can be calibrated directly in terms of the mechanical force.

It is well known that the usual alternating current measuring devices have certain disadvantages in non-uniformity of scale calibration, lack of sensitivity and the like, so that it is desirable to use a moving coil type of direct current instrument.

The present invention comprehends broadly an improvement in alternating current bridges, and particularly relates to one adapted for the simple and reliable indication of alternating current changes such as may be produced in a winding by the change of magnetic properties of a core material. In the preferred form illustrated it utilizes two similar alternating current circuits, in one of which the quantity of current is modified by a magnetostrictive effect in the field of a winding, or other means for varying the current flow, and in the other the current is limited by a winding of similar electrical characteristics except that it is non-responsive to the variable to be measured, the latter circuit acting to balance the effects of temperature and the like. The current flow in both circuits is separately impressed upon two similar rectifiers whose direct current terminals of opposite polarity are connected together, the measurements of the algebraic sum of the resulting direct currents or potentials giving the value desired with substantially all other variables being cancelled.

It is an object of this invention to provide an improved alternating current bridge, in which undesired effects of temperature, and the like are eliminated, and whose output is measurable by a direct current instrument.

Another object is to provide an arrangement of an apparatus which can be supplied from a low-voltage source of direct current, and which will be adapted to measure the magnitude of slowly varying mechanical forces by the effect of those forces on a magnetostrictive member.

Another object is to provide an arrangement of a force measuring device which is inherently sufficiently sensitive to require no amplification of its output.

These and other objects and advantages will be further apparent from the following description and the accompanying drawing, which forms a part of the specification and illustrates a preferred embodiment of the invention as applied to a force measuring device.

In the drawing, Figure 1 is a connection diagram for an application of the invention to a direct current supply.

Figure 2:
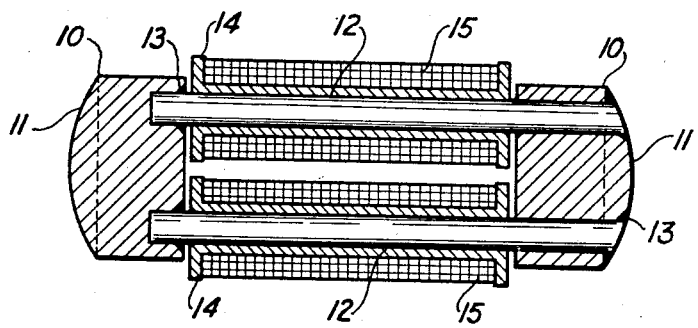

Figure 2 is a longitudinal sectional view of a magnetostrictive element which may be used with the apparatus of Figure 1 to measure a constant or slowly varying mechanical force applied to the ends of the element, in this case a compressive force.

Referring to Figure 2, the magnetostrictive element is illustrated as comprising a pair of end members 10 of steel or other good magnetic material, their outer faces being suitably shaped as at 11 to be received between complementary members so as to be compressed by the latter without receiving any substantial amount of torsion or bending. Between end members 10 are one or more rods or struts 12 of a magneostrictive material, for example an alloy of 52% nickel, 48% iron, and only traces of other elements, rods 12 being firmly secured to members 10 by means such as welds 13.

Surrounding rods 12 are spools 14 of suitable insulating material wound with wire 15 to form coils having the desired electrical characteristics for the conditions under which the device is to be used.

Referring to Figure 1, this arrangement is designed to be supplied by a source of low voltage direct current 16 which is modified by a suitable inverter 17 to give a uniformly varying alternating current of the desired characteristics and wave form. If available, a 110 volt 60 cycle alternating current supply may be substituted for 16 and 17. The alternating current is preferably regulated by means of a constant voltage transformer 18. In order to obtain two similar sources of alternating current, the output of transformer 18 is connected to transformer 19 which has two equal voltage secondaries 20 and 21.

In a first circuit, secondary 21 is connected in series with the windings 15 on the magnetostrictive element in Figure 2, and with a full-wave copper oxide or other suitable rectifier 23. In a second circuit, secondary 20 is connected in series with a balancing impedance winding 24, which has the same electrical characteristics as winding 15 except that its field is not influenced by the variable which it is desired to measure by winding 15, and is adjustable, so that it may be set to balance the impedance of winding 15 at any desired value of the latter. Secondary 20 and winding 24 are in series with a rectifier 25, preferably one having substantially identical characteristics to rectifier 23. Rectifier 23 is connected to a sensitive current measuring meter 28 by leads 26. Similarly, rectifier 25 is connected to meter 28 by leads 27, but in such a manner that the current outputs of the rectifiers are opposed through meter 28. Such a combination of connections can conveniently be designated as a third circuit which is adapted to oppose the outputs of the first and second circuits.

In operation, the balancing impedance winding 24 is set to such a value that the alternating current in the second circuit is equal to the alternating current in the first circuit. The direct current output of rectifier 23, which tends to flow through lead 26 and meter 28 is then exactly equal to the direct current output of rectifier 25 which tends to flow through lead 27 and meter 28 but in the opposite direction. Thus no current will flow through the meter due to the opposition of the two outputs. If a change is made in the variable which affects the impedance of winding 15, such as a modification of the magnetic properties of struts 12, this will be accompanied by a corresponding change in the output of rectifier 23 which will cause an unbalance in the previously adjusted system and will be indicated by meter 28. If, for example, the arrangement of Figure 2 is adapted to be compressed, meter 28 may be calibrated to read directly the value of the force involved. Variations in temperature and the like, as well as variations in rectifier characteristics, are balanced out by the arrangement shown.

If rectifier and other circuit variations are not of sufficient value to adversely affect the desired accuracy of the device, a single source of alternating current could be used and impressed upon coil 15 and rectifier 23, and a suitable source of direct current, such as a battery, could be substituted in circuit 26 for rectifier 25, without departing from the essence of the invention.

Obviously, the alternating current bridge arrangement described above can be applied to other uses, and certain changes may be made to the example illustrated in this specification, but it is to be understood that all such modifications and changes as come within the scope of the appended claims are embraced thereby.

I claim:

1. An alternating current bridge comprising a first circuit whose impedance is varied by changes in a quantity which it is desired to determine, means for passing a uniformly varying alternating current through said circuit, means for rectifying said current, a second circuit electrically similar to said first circuit but whose impedance is independent of the quantity it is desired to determine, means for adjusting the impedance of said second circuit independently of that of said first circuit, means for passing a similar uniformly varying alternating current through said second circuit, means for rectifying said second current, a third circuit connecting the direct current outputs from said rectifying means, and means in said third circuit for measuring the difference between the respective outputs of said rectifiers.

2. An alternating current bridge comprising a first circuit whose impedance is varied by changes in a quantity which it is desired to determine, means for passing a uniformly varying alternating current through said circuit, means for rectifying said current, a second circuit electrically similar to said first circuit but whose impedance is independent of the quantity it is desired to determine, means for adjusting the impedance of said second circuit independently of that of said first circuit, means for passing a similar uniformly varying alternating current through said second circuit, means for rectifying said second current, a third circuit connecting terminals of opposite polarity of said rectifying means, and means in said third circuit for measuring the difference between the outputs of said rectifying means.

3. An alternating current bridge comprising a winding whose impedance is varied by changes of permeability in a magnetostriction element in the field of said winding, means for passing a uniformly varying alternating current through said winding, means for rectifying said current, a second winding independently of that of said first winding electrically similar to said first winding but whose impedance is unaffected by said magnetostriction element, means for adjusting the impedance of said second winding, a means for passing a similar uniformly varying alternating current through said second winding, means for rectifying said second-named current, a circuit connecting the direct current terminals of opposite polarity of said rectifying means, and means in said last-named circuit for measuring the difference between the outputs of said rectifying means.

4. An electrical measuring device for determining the magnitude of a mechanical force by its effect upon a body of magnetostrictive material, comprising a first winding, a body of magnetostrictive material in the field of said winding, means for passing a uniformly varying alternating current through said winding, means for rectifying said current, a second winding uninfluenced by said magnetostrictive material, means for adjusting the impedance of said second winding independently of that of said first winding, means for passing a similar uniformly varying alternating current through said second winding, means for rectifying said second-named current, a direct current meter and a circuit opposing the outputs of said rectifying means through said meter for measuring the algebraic sum of the output currents.

5. An electrical measuring device for determining the magnitude of a mechanical force by its effect upon a body of magnetostrictive material, comprising a first winding, a body of magnetostrictive material in the field of said winding, means for applying a mechanical force to said last-named body to vary the magnetic permeability thereof, means for passing a uniformly varying alternating current through said winding, means for rectifying said current, a second winding outside of the influence of said magnetostrictive material, means for adjusting the impedance of said second winding independently of that of said first winding, means for passing a similar uniformly varying alternating current through said second winding, means for rectifying said second-named current, a circuit opposing the direct current outputs of said rectifying means, and a moving coil direct current meter connected in parallel with said last-named circuit, said meter indicating directly the variations in the said mechanical force.

KENNETH R. ELDREDGE.